US010143125B2

(12) United States Patent
Schleyer et al.

(10) Patent No.: US 10,143,125 B2
(45) Date of Patent: Dec. 4, 2018

(54) DEVICE AND METHOD FOR REGULATING THE OPERATION OF A HYDRAULICALLY OPERATED TOWING UNIT ON A VEHICLE

(71) Applicant: Robert Bosch GmbH, Stuttgart (DE)

(72) Inventors: Markus Schleyer, Ludwigsburg (DE); Steffen Rose, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 15/270,254

(22) Filed: Sep. 20, 2016

(65) Prior Publication Data

US 2017/0086348 A1 Mar. 30, 2017

(30) Foreign Application Priority Data

Sep. 24, 2015 (DE) .................. 10 2015 218 330

(51) Int. Cl.
| | | |
|---|---|---|
| *A01B 63/14* | (2006.01) | |
| *A01B 63/00* | (2006.01) | |
| *A01B 76/00* | (2006.01) | |
| *A01B 63/111* | (2006.01) | |
| *A01B 63/112* | (2006.01) | |
| *A01B 79/00* | (2006.01) | |
| *A01B 61/00* | (2006.01) | |
| *A01B 63/10* | (2006.01) | |

(52) U.S. Cl.
CPC ............. *A01B 63/14* (2013.01); *A01B 61/00* (2013.01); *A01B 63/10* (2013.01); *A01B 63/112* (2013.01); *A01B 63/1112* (2013.01); *A01B 63/145* (2013.01); *A01B 76/00* (2013.01); *A01B 79/00* (2013.01)

(58) Field of Classification Search
CPC ..... A01B 63/14; A01B 63/10; A01B 63/1112; A01B 63/112; A01B 63/145; A01B 61/00
USPC .......................................................... 701/50
See application file for complete search history.

(56) References Cited

U.S. PATENT DOCUMENTS

| | | | | |
|---|---|---|---|---|
| 9,078,391 | B2* | 7/2015 | Pichlmaier | A01B 63/112 |
| 9,706,696 | B2* | 7/2017 | Gschwendtner | A01B 63/112 |
| 2008/0137062 | A1* | 6/2008 | Holton | G01P 3/366 |
| | | | | 356/28 |
| 2012/0285318 | A1* | 11/2012 | Jessen | A01B 63/1006 |
| | | | | 91/403 |
| 2014/0343802 | A1* | 11/2014 | Pichlmaier | A01B 63/112 |
| | | | | 701/50 |
| 2015/0201547 | A1* | 7/2015 | Gschwendtner | A01B 63/112 |
| | | | | 172/7 |

(Continued)

FOREIGN PATENT DOCUMENTS

| | | |
|---|---|---|
| DE | 102 19 270 C1 | 4/2003 |
| DE | 10 2005 051 407 A1 | 5/2007 |

(Continued)

*Primary Examiner* — Krishnan Ramesh
(74) *Attorney, Agent, or Firm* — Maginot, Moore & Beck LLP

(57) ABSTRACT

A device for a vehicle, in particular a tractor, with a hydraulic actuating unit for regulating the operation of a towing unit on the vehicle comprises at least one speed detecting unit with two distance determining sensors positioned one after the other in the direction of travel of the vehicle and directed toward the ground and an analysis unit as well as data communications connections to a vehicle operating system and a hydraulic operating system associated with the hydraulic actuating unit.

10 Claims, 3 Drawing Sheets

(56) References Cited

U.S. PATENT DOCUMENTS

2017/0231146 A1\* 8/2017 Romig ................. A01B 59/002
　　　　　　　　　　　　　　　　　　　172/1

FOREIGN PATENT DOCUMENTS

| EP | 2 524 585 A2 | 11/2012 |
| EP | 2 583 543 A1 | 4/2013 |
| EP | 2 915 418 A1 | 9/2015 |
| WO | 2013/013917 A1 | 1/2013 |

\* cited by examiner

DEVICE AND METHOD FOR REGULATING THE OPERATION OF A HYDRAULICALLY OPERATED TOWING UNIT ON A VEHICLE

This application claims priority under 35 U.S.C. § 119 to patent application no. DE 10 2015 218 330.0, filed on Sep. 24, 2015, in Germany, the disclosure of which is incorporated herein by reference in its entirety.

The present disclosure concerns a device for a vehicle, in particular a tractor, with a hydraulic actuating unit for regulating the operation of a towing unit on the vehicle as well as a suitable operating method for the hydraulic actuating unit.

BACKGROUND

In particular, the disclosure is used with a tractor, an agricultural tractor, a mobile working machine for cultivating fields or similar. Tractors or agricultural tractors are used as universally applicable working machines, primarily in agriculture for working on farmland. Ploughing, as one of the most frequent applications, places high requirements on the drive train of the tractor and the accuracy of control of an electronic-hydraulic lifting mechanism control system, so that the ploughing work can only be carried out quickly and efficiently with a coordinated operation. Above all, with highly inhomogeneous and very wet ground, owing to a very high resistance force to ploughing there is the possibility that the tractor will get stuck and/or the engine will stall. In addition to positional control of the plough, traction force control can be provided that seeks to prevent stalling of the engine by measuring the traction force at the linkage of the lower link on the tractor side and regulating the force or the gradient thereof to a value that prevents stalling of the engine or causes a reduction of the slip of the pressure rollers. This is carried out in particular by (briefly) raising the plough and the resulting reduction of the resistance force of the plough.

With very wet ground however, it is also possible that the tractor can become bogged down without the engine stalling. This is primarily detected in the event of a great deal of slip of the drive wheels, which can no longer provide a traction force or cannot provide sufficient traction force.

In order to limit the slip to an acceptable extent and to prevent excessive spinning of the drive wheels, it is known to equip the system of the electronic hydraulic lifting mechanism control system with a radar sensor or an ultrasound sensor that measures the actual speed of the tractor based on the Doppler effect. As in addition the wheel revolution rate of the drive wheels is known, the (current) slip of the drive wheels can be concluded by comparing the actual speed with the (expected) speed that is determined based on the wheel revolution rate. An additional slip control loop that is superimposed on the position and traction force control can ensure the maximum acceptable slip by raising the plough and thereby prevent bogging down of the tractor. In addition, a fixed predetermined target slip value can be regulated in order to potentially achieve energy efficient operation, because the traction forces are increased by this means and the engine may be able to be better utilized.

Even if the approaches outlined for the operation of such tractors or agricultural tractors will already produce good results, the available systems are nevertheless sometimes too complex and hence too cost intensive, not sufficiently reliable and/or too inaccurate. In this respect, there is a need for improvements, in particular during the determination of the drive slip or the determination of the actual speed.

SUMMARY

Based on the above, it is the object of the present disclosure to provide a device and a method that alleviate or even prevent the disadvantages. In particular, the determination of the actual speed of travel is to be improved in a way that is structurally simple and suitable for the ambient conditions in the field.

to These objects are achieved with a device and a method according to the independently formulated claims. Further embodiments of the disclosure are specified in the dependently formulated claims. It should be noted that the description, in particular in combination with the figures, cites further details and developments of the disclosure that can be combined with the features from the claims.

A device for a vehicle with a hydraulic actuating unit for regulating the operation of a towing unit on the vehicle, comprising at least one speed detecting unit with two distance determining sensors positioned one after the other in the direction of travel of the vehicle and directed toward the ground and an analysis unit as well as data communications connections to a vehicle operating system and a hydraulic operating system associated with the hydraulic actuating unit, contributes to this aim.

The vehicle is, in particular, a tractor or a so-called agricultural tractor. In particular, a plough or a similar ground working implement is considered as a towing unit. A speed detecting unit with at least a first distance determining sensor and a second distance determining sensor is provided for the determination of the "actual" speed. Both distance determining sensors can each comprise a transmitter and a receiver and can emit light waves or sound waves to the ground on request by the analysis unit for example and receive the reflected sound waves from the ground. A distance determining sensor can track the distance with acoustic or optical waves and, in particular, can be implemented as an ultrasound sensor or a laser sensor (laser triangulator or laser interferometer). The analysis unit can, therefore, be connected to the two distance determining sensors electrically for data communications and can be configured to regulate the operation thereof and to process the measurement signals thereof. In particular, the analysis unit is configured to (continuously) determine a characteristic ground profile from measurement signals of the distance determining sensors using characteristic reference points of the ground profile to determine a time offset of the measurement signals at the characteristic reference points and to determine therefrom the actual speed of the vehicle. The actual speed determined in the analysis unit can be aligned with or influenced by predetermined parameters of the vehicle operating system, wherein a control signal is also transmitted to the hydraulic operating system and the operation of the hydraulic actuating unit of the towing unit can be influenced thereby.

It is preferable that the distance determining sensors are offset relative to each other with a separation in the region of 10 cm to 30 cm [centimeters]. The separation is preferably firmly fixed and particularly preferably lies in the region of about 20 cm. The region proposed here is particularly suitable for achieving a high signal quality, on the one hand in relation to a sampling ratio and on the other hand in relation to the consistency of the ground profile. The separation of the distance determining sensors and the time offset of the measurement signals can be used for the determination of the actual speed, so that the problem has been solved by the construction and design of the system in a particularly simple way.

Furthermore, it is considered to be advantageous that the distance determining sensors are positioned at a distance in the region of 30 cm to 100 cm [centimeters] from the ground (or a planar ground surface through the wheel contact points). For a particularly good signal quality, a distance of at least 30 cm is proposed. In the light of a good resolution of the ground profile, the distance should be limited to a maximum of 100 cm, possibly even to a maximum of 60 cm.

The distance determining sensors can be positioned on an underside of the vehicle close to and behind a front wheel. On the one hand, this enables the positioning of the distance determining sensors at the specified distance from the ground and moreover may result in a ground profile produced by the front wheel (regular or specifically designed) being detected. For this purpose, at least the first distance determining sensor can be disposed directly and/or flush behind a front wheel (when viewed in the direction of travel).

The distance determining sensors are preferably oriented (essentially) at right angles to the ground. The mounting of the distance determining sensors between the front and rear wheels of the vehicle or tractor provides a protected space. If the distance determining sensors are disposed immediately close to and behind a front wheel, there is a raising of the profile owing to the tire pressure of the front wheel while traveling that is characteristic and that can be detected well with the distance determining sensors. The measuring accuracy is further improved owing to additional mechanical protection against fouling of the distance determining sensors.

It is further preferable that the speed detecting unit also comprises an acceleration sensor (also known as an inertial sensor) that has a data communications connection to the analysis unit. This enables a further measure of the actual speed to be obtained by means of an additional integration of the acceleration values (continuously) measured with the acceleration sensor. This can also be processed in the analysis unit. The acceleration sensor is advantageously mounted in the cab of the vehicle or tractor so as to be protected against ambient influences.

The hydraulic actuating unit preferably comprises a lifting mechanism for the towing unit that can be activated by the analysis unit. For this purpose, in particular, electrical or data communications connections are provided. In particular, the analysis unit and the lifting mechanism are configured so that the analysis device can adjust at least one state variable and/or can access a control element of the lifting mechanism.

Further details of the device are revealed in the following description of the operating method. In this respect, the descriptions of the method can be additionally used here. It also applies that the previous descriptions of the device can add to the description of the method.

According to a further aspect, a method is proposed for the operation of a vehicle, in particular of a tractor, with a hydraulic actuating unit for regulating the operation of a towing unit on the vehicle. The method can, in particular, be carried out with the device that is also proposed here, wherein, in particular, the analysis unit is configured to carry out the method. The method comprises at least the following steps:

a) Determination of a ground profile while the vehicle is traveling by means of two distance determining sensors that are positioned one after the other in the direction of travel of the vehicle and that are directed toward the ground;
b) Determination of the time offset of the respective ground profile determined with a distance determination sensor;
c) Determination of the speed of the vehicle from the time offset;
d) Comparing the determined speed with an expected speed for the determination of a drive slip;
e) Activation of a lifting mechanism of the towing unit if the drive slip exceeds a reference value.

The steps of the method can be carried out in the sequence specified here. It is possible that individual steps can be carried out at the same time and/or superimposed on each other.

Step a) comprises in particular at least one, preferably all, of the following processes:

a.1) Determining a ground profile at a point A with a first distance determining sensor by emitting optical or acoustic waves (essentially) at right angles to the ground and detecting the reflected waves from the ground and tracking the characteristic measurement signals for the distance from the ground against time.
a.2) Determining a ground profile at a point B (with a predetermined separation behind and flush with the point A in the direction of travel) with a second distance determining sensor by emitting optical or acoustic waves (essentially) at right angles to the ground and detecting the reflected waves from the ground and tracking the characteristic measurement signals for the distance from the ground against time.

Step b) comprises, in particular, the comparison of the ground profile determined by means of the distance determining sensors and the identification of characteristic features appearing in both ground profiles. The time offset with which the ground profiles were detected by measurement can be determined therefrom.

According to step b), the actual speed of the vehicle in relation to the direction of travel can be determined and calculated, preferably in the analysis unit, from the time offset determined in step c) and the known position of the distance determining sensors.

The actual speed determined in this way is further compared in step d) with an expected speed for the determination of the current drive slip. The expected speed is produced for example by taking into account the wheel revolution rate. If the actual speed and the expected speed are essentially equal, there is consequently also essentially no drive slip. If the actual speed is considerably less than the expected speed, there is a significant drive slip—the drive wheel is therefore spinning.

Based on the result of step d) in combination with a (firmly or variably) predeterminable reference value for the target or maximum permissible drive slip, in step e) the lifting mechanism can be activated. Thus for example on reaching or exceeding the reference value the towing unit can be lowered or raised. This changes the load or traction force on the vehicle, which has a direct influence on the actual drive slip. Consequently, the drive slip of the vehicle can be regulated or adjusted by operating the lifting mechanism of the towing unit.

Particularly preferably, the determined actual speed over the ground can be used for the determination or adjustment of the drive slip of the driven vehicle wheels. Using the signals for the actual speed of travel and the known revolution rate of the driven wheels (for example from the gearbox control unit or the additional wheel sensors), the slip of the drive wheels can be determined and limited/adjusted.

It is preferable that the ground profile determined in step a) is produced from the vehicle while traveling. This is preferably a characteristic or repeating pattern in the ground. It is highly particularly preferable that the ground profile is continuously produced by a front wheel of the vehicle. The wheel profile may comprise characteristic (or individual) profile markings that are then specifically detected with the distance determining sensors, which are preferably implemented as ultrasound sensors.

An acceleration sensor can also be provided on the vehicle, with which the (actual) speed is determined independently. The speed determined in step c) can be checked or offset using the speed determined by the acceleration sensor. In this case a plausibility check and/or an adjustment of the actual speed can be carried out, using which regulation is carried out in step e).

Thus in step d) the speed determined by means of the acceleration sensor can be used if a predeterminable deviation parameter is reached. The deviation parameter constitutes, in particular, a measure of the difference of the "actual" speeds that are determined independently of each other, wherein in the case of an excessive difference a decision is taken to give the speed determined by means of the acceleration sensor the priority or a greater importance. Thus the deviation parameter can, for example, be specified so that in situations in which a measurement with the distance determining sensors fails or is too inaccurate (for example when traveling over puddles or ground segments without a pronounced profile), the speed measurement by means of the acceleration sensor is briefly resorted to. If the speed has fallen below the deviation parameter again, the speed measurement by means of the distance determining sensors is again given priority.

The expected speed is preferably determined and provided by a vehicle operating system. Known data or data simply provided by the vehicle operating system can be accessed for this. In particular, the analysis unit is suitably equipped for this.

The arrangement and/or method shown here for slip regulation provide in particular the following advantages:
 time and fuel costs are reduced,
 tire wear is reduced,
 the ground is protected,
 the load on the driver is reduced,
 bogging down is avoided.

The function is implemented by measurement of the actual speed by means of the distance determining sensors in a reliable, accurate and technically simple manner.

BRIEF DESCRIPTION OF THE DRAWINGS

The disclosure and the technical environment are described in detail below using figures. During this, identical components are routinely characterized using the same reference characters. The representations are schematic and are not provided to show relative sizes. The descriptions given with reference to individual details of a figure can be extracted and freely combined with facts from other figures or previous descriptions, unless this is conclusively indicated otherwise to a person skilled in the art or such a combination is explicitly prohibited here. In the figures.

DETAILED DESCRIPTION

Figure 1:
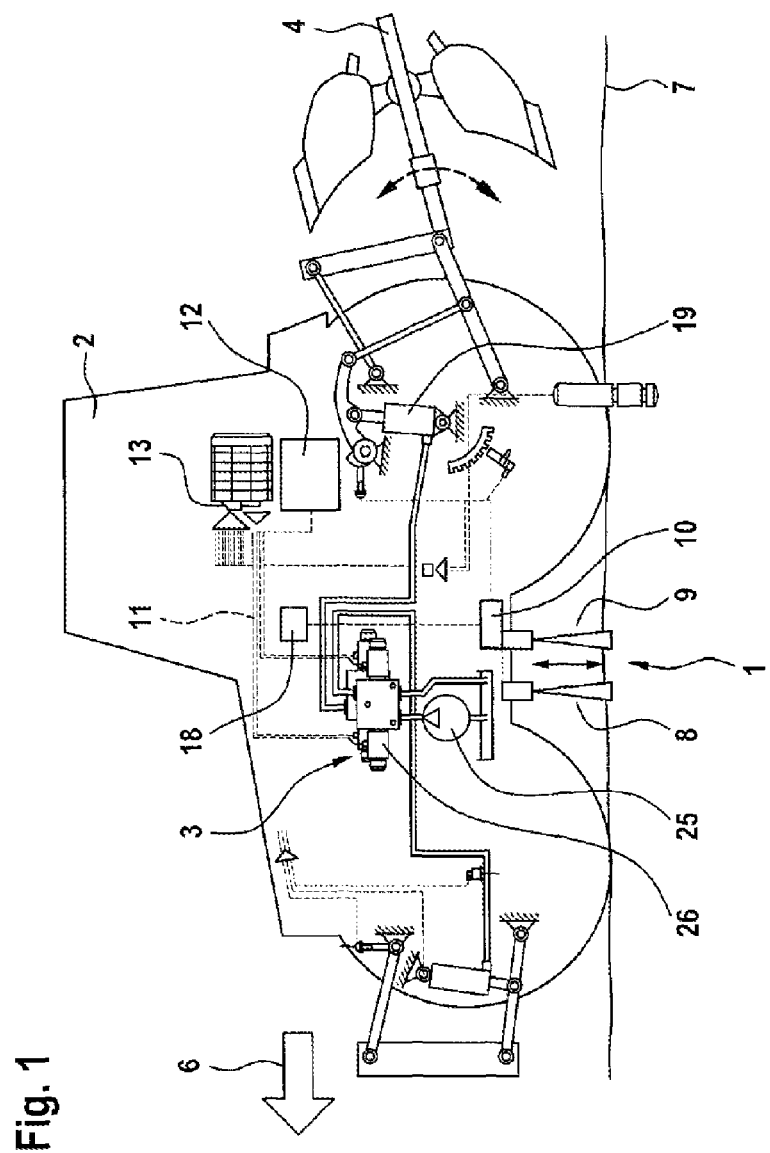
FIG. 1: shows schematically a side view of a tractor with a hydraulic actuating unit for regulating the operation of a towing unit and a speed detecting unit.

FIG. 1 shows the basic illustration of a device 1 on a vehicle 2, in particular in the form of a tractor, during the cultivation of the soil with a towing unit 4, in particular with a plough. The location or position of the towing unit 4 can be adjusted with a hydraulic actuating unit 3, comprising a hydraulic operating system 13 and a lifting mechanism 19. The hydraulic actuating unit 3 can, in particular, be constructed as follows: the pump 25 delivers a flow of oil to the regulating valve 26, which controls the lifting mechanism 19. The lifting mechanism 19 acts on the lower link, whereby the towing unit 4 can be raised, held or lowered.

Further, a speed detecting unit 5 is provided with a first distance determining sensor 8 (in particular an ultrasound sensor) and a second distance determining sensor 9 (in particular an ultrasound sensor) positioned one after the other in the direction of travel 6 of the vehicle 2 and directed toward the ground 7. Furthermore, the speed detecting unit 5 comprises an analysis unit 10, with which in particular the distance determining sensors can be operated under control and the measurement results thereof can be analyzed. Further, a number of data communications connections 11 to a vehicle operating system 12 and a hydraulic operating system 13 associated with the hydraulic actuating unit 3 are provided. In this case, the analysis unit 10 can also be part of the hydraulic operating system 13. The analysis unit 10 can also operate or activate the lifting mechanism 19 of the towing unit 4.

Further, the speed detecting unit 5 also comprises an acceleration sensor 18 that has a data communications connection to the analysis unit 10. The acceleration sensor 18 is positioned within the vehicle 2 here.

Figure 2:
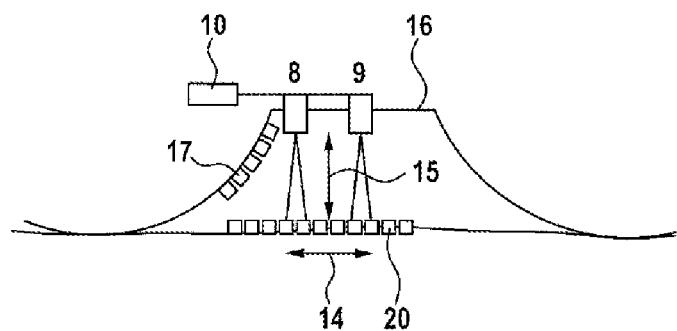
FIG. 2: shows a detail of a speed detecting unit.

FIG. 2 shows by way of example the design of the measuring arrangement for the determination of the actual speed of the vehicle. In this case, the first distance determining sensor 8 is disposed in close proximity behind a front wheel 17 of the vehicle and determines a separation from the ground 7 against time, so that a ground profile 20 can be determined. The second distance determining sensor 9, which is downstream in the direction of travel, is mounted in a fixed position on an underside 16 of the vehicle with a separation 14 parallel to the direction of travel (and thereby at a predetermined distance 15 from the ground 7). It is preferable that the detected ground profile 20 is produced by a tire profile of the front wheel 17. A characteristic raising of the profile that can be detected well results from the tire footprint of the front wheel 17 during motion, which can be measured well with the distance determining sensors 8, 9.

With the arrangement of the two distance determining sensors 8, 9, the determination of an actual speed over the ground can be carried out. The distance determining sensors 8, 9 can also be protected against fouling by ground material thrown up by the front wheels 17 by a funnel or a "splash protection means" (not shown).

With the device 1, in particular, the operation of the hydraulic actuating unit 3 can be controlled depending on or for regulation of the drive slip. For this purpose, initially the ground profile 20 is detected by means of the two distance determining sensors 8, 9 while the vehicle 2 is traveling. Further, the time offset of the ground profile 20 that is determined with the distance determining sensors 8, 9 can then be determined. The actual speed of the vehicle 2 can be determined therefrom. The speed determined in this way can be compared with an expected speed (or a speed determined at the engine or at the wheel) for the determination of a drive slip. If the result thereof is that the drive slip lies in an unwanted region, the lifting mechanism 19 of the towing unit 4 can then be activated (initiated by the analysis unit), in order to adjust the acting resistance force and thereby also influence the drive slip.

Figure 3:
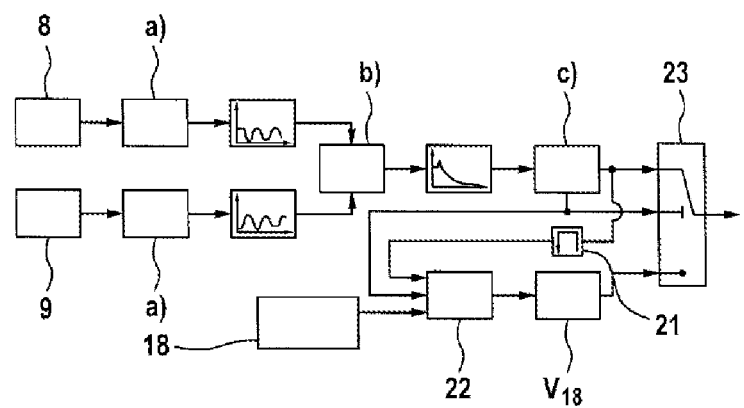
FIG. 3: shows a block diagram of an electronic device to illustrate an exemplary analysis algorithm for the determination of the speed.

FIG. 3 shows a basic simplified illustration of a possible analysis algorithm. The signals of the distance determining sensors 8 and 9 are analyzed according to the steps a) described above as to whether a profile height of the ground against time exists. By cross-correlation of the signals from the distance determining sensors 8 and 9, the time offset of each generated measurement signal can be concluded; compare descriptions for step b). Further, the speed signal determined according to step c) is checked for plausibility, for example for whether the measurement has failed owing to adverse ground conditions (puddles, hardly any raising of the profile in the time frame of the measurement, etc.).

The speed signal determined according to step c) is forwarded to a selection element 23 and to a memory 21. A further (doubled) speed signal decides at the selection element 23 whether the speed determined from step c) or a time integrated value of the actual speed using an acceleration sensor 18 ($V_{18}$) is output as the actual speed of travel and thereby for use in steps d) and e). The decision can, in particular, depend upon whether a predetermined deviation parameter was achieved or not. The acceleration signal determined by the acceleration sensor 18 and possibly filtered is integrated against time in an integrator 22. In order to prevent excessive drift of the integrated acceleration signal, the integrator is reset following a negative plausibility check and an initial value is passed to it that corresponds to one or more sampling or calculation steps of the stored speed signal from the memory 21.

Figure 4:
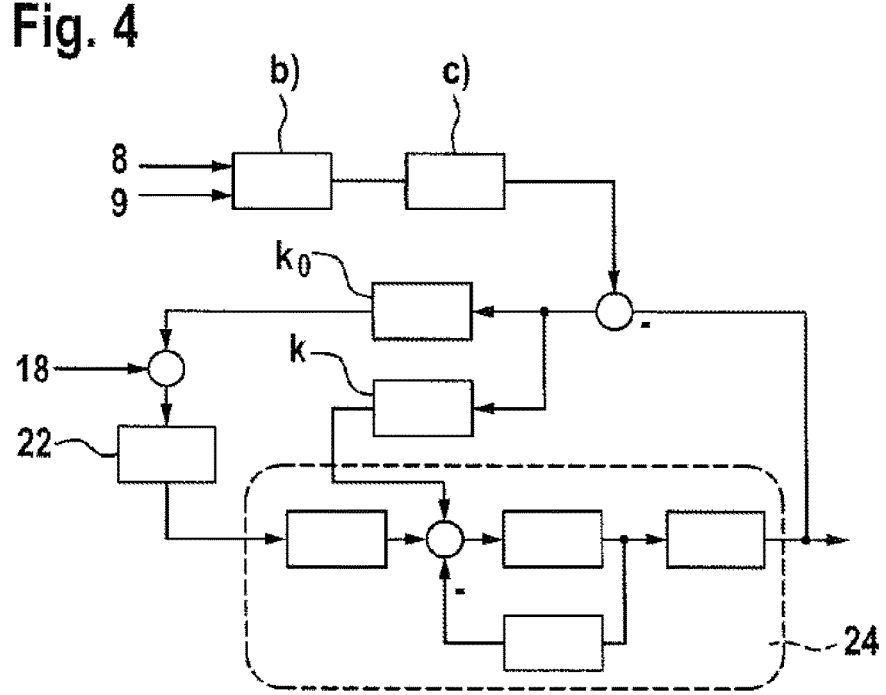
FIG. 4 shows a further block diagram of an electronic device to illustrate a further analysis algorithm for the determination of the speed.

FIG. 4 shows a detail, according to which it is (additionally) possible to support or adjust the speed derived from the distance determining sensors 8, 9 by means of the acceleration signal obtained from the acceleration sensor 18. During this a low pass filtered speed value is compared with the correlated speed value from the measurement with the distance determining sensors 8, 9 (according to steps a), b) and c)). The resulting control deviation is multiplied by k and summed with the acceleration value that is generated by the acceleration sensor 18. The sum is again integrated in an integrator 22. The integrated value can be low pass filtered with a state model (low pass filter 24). The low pass filtered speed value is used as the "actual" speed of the vehicle over the ground for the slip regulation and thereby the subsequent steps d) and e).

REFERENCE CHARACTER LIST

1 device
2 vehicle
3 hydraulic actuating unit
4 towing unit
5 speed detecting unit
6 direction of travel
7 ground
8 first distance determining sensor
9 second distance determining sensor
10 analysis unit
11 data communications connection
12 vehicle operating system
13 hydraulic operating system
14 separation
15 distance
16 underside
17 front wheel
18 acceleration sensor
19 lifting mechanism
20 ground profile
21 memory
22 integrator
23 selection element
24 low pass filter
25 pump
26 regulating valve

What is claimed is:

1. A method for operating a vehicle with a hydraulic actuating unit for regulating an operation of a towing unit on the vehicle, comprising:
    a) determining a respective ground profile while the vehicle is traveling with each of two distance determining sensors positioned one after the other in a direction of travel of the vehicle and directed toward the ground;
    b) determining a time offset of the determined respective ground profiles;
    c) determining a speed of the vehicle from the determined time offset;
    d) comparing the determined speed with an expected speed in order to determine a drive slip; and
    e) activating a lifting mechanism of the towing unit if the determined drive slip exceeds a reference value.

2. The method according to claim 1, wherein the respective ground profiles are produced while the vehicle is traveling.

3. The method according to claim 1, further comprising:
    determining the speed of the vehicle independently with an acceleration sensor provided on the vehicle; and
    checking or offsetting the speed of the vehicle determined with the acceleration sensor with the speed determined from the determined time offset.

4. The method according to claim 3, further comprising:
    using in step d) the speed of the vehicle determined with the acceleration sensor if a predetermined deviation parameter is reached.

5. The method according to claim 1, further comprising:
    determining and providing the expected speed with a vehicle operating system.

6. A vehicle that has a control device configured to carry out a method for operating the vehicle with a hydraulic actuating unit for regulating an operation of a towing unit on the vehicle, the method comprising:
    a) determining a respective ground profile while the vehicle is traveling with each of two distance determining sensors positioned one after the other in a direction of travel of the vehicle and directed toward the ground;
    b) determining a time offset of the determined respective ground profiles;
    c) determining a speed of the vehicle from the determined time offset;
    d) comparing the determined speed with an expected speed in order to determine a drive slip; and
    e) activating a lifting mechanism of the towing unit if the determined drive slip exceeds a reference value.

7. The vehicle according to claim 6, wherein the respective ground profiles are produced while the vehicle is traveling.

8. The vehicle according to claim 6, wherein the method further comprises:
   determining the speed of the vehicle independently with an acceleration sensor provided on the vehicle; and
   checking or offsetting the speed of the vehicle determined with the acceleration sensor with the speed determined from the determined time offset.

9. The vehicle according to claim 8, wherein the method further comprises using in step d) the speed of the vehicle determined with the acceleration sensor if a predetermined deviation parameter is reached.

10. The vehicle according to claim 6, wherein the method further comprises determining and providing the expected speed with a vehicle operating system.

* * * * *